United States Patent
Vaccaro et al.

(10) Patent No.: US 11,588,309 B2
(45) Date of Patent: Feb. 21, 2023

(54) DEVICES AND METHODS FOR HOLDING CABLES

(71) Applicant: CommScope Technologies LLC, Hickory, NC (US)

(72) Inventors: Ronald A. Vaccaro, Taylorsville, NC (US); Aviral Joshi, Chicago, IL (US); Christopher Stockman, Bella Vista, AR (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/585,017

(22) Filed: Jan. 26, 2022

(65) Prior Publication Data

US 2022/0149603 A1 May 12, 2022

Related U.S. Application Data

(63) Continuation of application No. 16/814,472, filed on Mar. 10, 2020, now Pat. No. 11,271,378, which is a
(Continued)

(51) Int. Cl.
*H02G 3/04* (2006.01)

(52) U.S. Cl.
CPC ......... *H02G 3/0456* (2013.01); *H02G 3/0406* (2013.01); *H02G 3/0493* (2013.01)

(58) Field of Classification Search
CPC .. H02G 3/0456; H02G 3/0406; H02G 3/0493; H02G 3/263; H02G 3/02;
(Continued)

(56) References Cited

U.S. PATENT DOCUMENTS

| 2,936,980 A | 5/1960 | Rapata |
| 3,054,585 A | 9/1962 | Roberts et al. |

(Continued)

FOREIGN PATENT DOCUMENTS

| CN | 1653288 A | 8/2005 |
| CN | 104737400 A | 6/2015 |

(Continued)

OTHER PUBLICATIONS

Notification of the First Office Action dated Apr. 6, 2022 in corresponding Chinese Application No. 201980066610.2 (including English translation).
(Continued)

*Primary Examiner* — Nkeisha Smith
(74) *Attorney, Agent, or Firm* — Myers Bigel, P.A.

(57) ABSTRACT

The present disclosure describes devices and assemblies for holding cables. A device adapted for holding one or more discrete cables may include a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, wherein the securing feature is configured to be received through one of the plurality of apertures when the main body is wrapped around the one or more discrete cables. Methods of holding cables are also provided.

16 Claims, 7 Drawing Sheets

Related U.S. Application Data continuation-in-part of application No. 16/710,558, filed on Dec. 11, 2019, now Pat. No. 11,268,635.

(60) Provisional application No. 62/849,398, filed on May 17, 2019, provisional application No. 62/785,829, filed on Dec. 28, 2018.

(58) Field of Classification Search
CPC .......... H02G 3/32; F16L 3/137; F16L 3/2336; B65D 63/1027; B65D 2563/101
USPC ......... 248/74.3, 71, 72, 73, 74.1, 74.2, 74.4, 248/74.5, 65, 68.1, 70; 24/16 r, 16 pb
See application file for complete search history.

(56) References Cited

U.S. PATENT DOCUMENTS

| | | | |
|---|---|---|---|
| 3,088,702 A | | 5/1963 | Orenick et al. |
| 3,144,695 A | * | 8/1964 | Budwig ................ F16L 3/2332 292/307 R |
| 3,169,004 A | * | 2/1965 | Rapata ...................... F16B 2/08 248/74.5 |
| D205,277 S | | 7/1966 | Gilchrist |
| 3,269,680 A | * | 8/1966 | Bryant ..................... H02G 3/24 24/339 |
| 3,550,219 A | | 12/1970 | Buren |
| 3,552,696 A | | 1/1971 | Orenick |
| 3,719,971 A | | 3/1973 | Lodi |
| 3,758,060 A | | 9/1973 | Schuplin |
| 3,887,965 A | | 6/1975 | Schuplin |
| 3,930,287 A | * | 1/1976 | Grise ................... A44C 5/0053 24/16 PB |
| 3,965,538 A | | 6/1976 | Caveney et al. |
| 4,045,843 A | | 9/1977 | Loose et al. |
| 4,061,299 A | * | 12/1977 | Kurosaki .............. F16L 3/1203 248/222.12 |
| 4,235,404 A | * | 11/1980 | Kraus ..................... F16L 3/233 248/74.3 |
| 4,261,539 A | | 4/1981 | Albern et al. |
| 4,342,438 A | | 8/1982 | Robert |
| 4,356,987 A | | 11/1982 | Schmid |
| 4,389,754 A | * | 6/1983 | Sohma .................... F16L 3/137 24/17 AP |
| 4,455,715 A | | 6/1984 | Matsui |
| 4,490,886 A | | 1/1985 | Omata |
| 4,518,297 A | * | 5/1985 | Kraus ................. F16B 37/0842 411/908 |
| 4,561,153 A | | 12/1985 | Matsui |
| 4,570,303 A | | 2/1986 | Richmond et al. |
| 4,673,150 A | * | 6/1987 | McSherry ............... F16L 3/233 248/74.3 |
| 4,728,064 A | * | 3/1988 | Caveney ............ B65D 63/1081 248/74.3 |
| 4,860,979 A | | 8/1989 | Camenisch |
| 5,154,376 A | | 10/1992 | Baum et al. |
| 5,706,558 A | | 1/1998 | Sauer |
| 5,760,338 A | | 6/1998 | Suzuki |
| 5,799,376 A | | 9/1998 | Harsley |
| 5,816,546 A | | 10/1998 | Miller |
| 5,884,368 A | | 3/1999 | Boe |
| 6,394,695 B1 | | 5/2002 | Chausset |
| 6,443,403 B1 | * | 9/2002 | Page ........................ H02G 3/32 248/68.1 |
| 6,807,715 B1 | | 10/2004 | Blair |
| 6,935,001 B2 | * | 8/2005 | Barriuso ............... F16L 3/2334 24/17 AP |
| 7,704,587 B2 | | 4/2010 | Harsley |
| 7,832,693 B2 | | 11/2010 | Moerke et al. |
| 8,282,047 B2 | | 10/2012 | Franks |
| 8,316,514 B2 | | 11/2012 | Sano |
| 8,342,460 B2 | | 1/2013 | Binkert et al. |
| 8,376,287 B2 | | 2/2013 | Zhang |
| 8,616,507 B2 | | 12/2013 | Willey |
| 9,004,417 B2 | | 4/2015 | Elsner et al. |
| D729,054 S | | 5/2015 | Chen et al. |
| 9,306,380 B2 | | 4/2016 | Vaccaro |
| 9,611,083 B2 | * | 4/2017 | Schuttler ............ B65D 63/1027 |
| 9,866,004 B2 | | 1/2018 | Vaccaro et al. |
| 9,903,510 B2 | | 2/2018 | Joshi et al. |
| 10,479,573 B2 | | 11/2019 | Winter |
| 10,604,317 B2 | * | 3/2020 | Chmelar ............ B65D 63/1027 |
| 10,681,965 B1 | | 6/2020 | Emile |
| 10,717,572 B2 | | 7/2020 | Wiles et al. |
| 10,760,715 B1 | | 9/2020 | Livingston |
| 2002/0084388 A1 | | 7/2002 | Geiger |
| 2006/0192059 A1 | | 8/2006 | Morello |
| 2007/0290100 A1 | * | 12/2007 | Caveney .................. H02G 3/32 248/74.3 |
| 2009/0026327 A1 | | 1/2009 | Zeuner et al. |
| 2009/0172922 A1 | | 7/2009 | Laporte |
| 2010/0116524 A1 | | 5/2010 | Mizutani et al. |
| 2015/0252832 A1 | | 9/2015 | Le Grange |
| 2016/0020000 A1 | | 1/2016 | Doushita et al. |
| 2016/0025242 A1 | | 1/2016 | Benthien et al. |
| 2016/0061356 A1 | | 3/2016 | Raymond et al. |
| 2016/0121822 A1 | | 5/2016 | Shaw et al. |
| 2017/0050786 A1 | * | 2/2017 | Kozminkse ........ B65D 63/1027 |
| 2017/0261143 A1 | | 9/2017 | Boyes |
| 2017/0307117 A1 | | 10/2017 | Gugau et al. |
| 2018/0244447 A1 | | 8/2018 | Chmelar et al. |
| 2020/0347962 A1 | * | 11/2020 | Smith ....................... F16L 3/04 |

FOREIGN PATENT DOCUMENTS

| | | |
|---|---|---|
| CN | 105357602 A | 2/2016 |
| CN | 105917538 A | 8/2016 |
| EP | 1186817 A2 | 3/2002 |
| EP | 1186817 A3 | 5/2003 |
| JP | 11069575 | 3/1999 |
| WO | 8602709 A1 | 5/1986 |

OTHER PUBLICATIONS

"Extended European Search Report corresponding to European Application No. 21161676.8 dated Jul. 13, 2021".

"International Preliminary Report on Patentability corresponding to International Application No. PCT/US2019/065852 dated Jul. 8, 2021".

"International Search Report and Written Opinion corresponding to International Application No. PCT/US2019/065852".

Extended European Search Report corresponding to European Application No. 19902057.9 dated May 19, 2022.

\* cited by examiner

DEVICES AND METHODS FOR HOLDING CABLES

RELATED APPLICATIONS

The present application is a continuation of U.S. patent application Ser. No. 16/814,472, filed Mar. 10, 2020, which claims priority under 35 U.S.C. § 120 as a continuation-in-part of U.S. patent application Ser. No. 16/710,558, filed Dec. 11, 2019, which in turn claims priority under 35 U.S.C. § 119 to U.S. Provisional Patent Application Ser. No. 62/785,829, filed Dec. 28, 2018, and U.S. Provisional Patent Application Ser. No. 62/849,398, filed May 17, 2019, the disclosures of which are hereby incorporated herein by reference in their entireties.

FIELD

The present invention relates to devices and methods for holding cables.

BACKGROUND

Currently, there a variety of metallic (e.g., stainless steel) cable hangers that are used to hold or bundle and secure cables to the top of telecommunications towers, such as, for example, U.S. Pat. No. 9,306,380 to Vaccaro, U.S. Pat. No. 9,866,004 to Vaccaro et al., and U.S. Pat. No. 9,903,510 to Joshi, each of which are incorporated herein by reference in their entireties. However, the use of metal components near an antenna on cell sites can be a source of unwanted passive intermodulation (PIM) in the modern radio frequency (RF) environment. There may be a need for non-metallic, non-magnetic cable hangers for cables used in small cell telecommunications towers that reduce costs and allow for easy installation, while alleviating technical performance concerns, such as, PIM.

SUMMARY

A first aspect of the present invention is directed to a device adapted for holding one or more discrete cables. The device may comprise a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, wherein the securing feature is configured to be received through one of the plurality of apertures when the main body is wrapped around the one or more discrete cables.

Another aspect of the present invention is directed to a device for holding cables, in combination with one or more discrete cables. The device may comprise a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, each aperture adapted to receive the securing feature, wherein the main body is wrapped around the one or more discrete cables and the securing feature is received through one of the plurality of apertures, thereby holding the one or more discrete cables.

Another aspect of the present invention is directed to a device adapted for holding one or more discrete cables. The device may comprise a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables; a securing feature attached to or integral with the mounting portion of the main body and configured to be secured to a mounting structure; a plurality of apertures along the longitudinal axis of the wrapping portion of the main body, each aperture adapted to receive the securing feature; and one or more conforming members along the length of a bottom of the wrapping portion of the main body, the one or more conforming members configured to further secure the one or more discrete cables when the one or more cables are circumscribed by the main body.

Another aspect of the present invention is directed to a method for holding one or more discrete cables. The method may comprise providing a device adapted for holding one or more discrete cables, the device comprising: a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, wherein the securing feature is configured to be received through one of the plurality of apertures when the main body is wrapped around the one or more discrete cables; wrapping the wrapping portion of the main body of the device around the one or more discrete cables; and inserting the securing feature through one of the apertures, thereby holding the one or more discrete cables.

Another aspect of the present invention is directed to a device adapted for holding one or more discrete cables. The device may comprise a flexible main body formed of a polymeric material having a length, a width, a thickness, and a longitudinal axis, the main body including a wrapping portion, a mounting portion, and a frangible portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, wherein the securing feature comprises a threaded post and a capture member, the threaded post configured to be received through one of the plurality of apertures when the main body is wrapped around the one or more discrete cables, the capture member attached to the main body by the frangible portion and configured to be detached from the main body and secured onto the threaded post.

Another aspect of the present invention is directed to a method for holding one or more discrete cables. The method may comprise (i) providing a device adapted for holding one or more discrete cables, the device may comprise a flexible main body formed of a polymeric material having a length, a width, a thickness, and a longitudinal axis, the main body including a wrapping portion, a mounting portion, and a frangible portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, wherein the securing feature comprises a threaded post and a capture member, the threaded post configured to be received through one of the plurality of apertures when the main body is wrapped around the one or more discrete cables, the capture member attached to the main body by the frangible portion and configured to be detached from the main body and secured onto the threaded post; (ii) wrapping the wrapping portion of the main body of the device around the one or more discrete cables; (iii) breaking the frangible portion to detach the capture member from the main body; (iv) inserting the threaded post through one of the apertures; and (v) securing the capture member onto the threaded post, thereby holding the one or more discrete cables.

Another aspect of the present invention is directed to a device adapted for holding one or more discrete cables. The device may include a flexible main body formed of a polymeric material having a length, a width, a thickness, and a longitudinal axis. The main body includes a wrapping portion and a mounting portion, where the wrapping portion is configured to be wrapped such that the main body circumscribes the one or more discrete cables. The device may further include a plurality of apertures along the longitudinal axis of the wrapping portion of the main body and a securing feature attached to or integral with the mounting portion of the main body and configured to be secured to a mounting structure, where the securing feature comprises two barbs separated by a cavity. The cavity may be configured to cooperate with a respective section of the wrapping portion residing between two adjacent apertures. The device may further include a plug feature attached to or integral with the mounting portion of the main body and configured to be inserted into the cavity of the securing feature, where the barbs of the securing feature is configured to be received through two adjacent apertures and the cavity is configured to cooperate with a respective section of the wrapping portion residing between the two adjacent apertures when the main body is wrapped around the one or more discrete cables.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1:
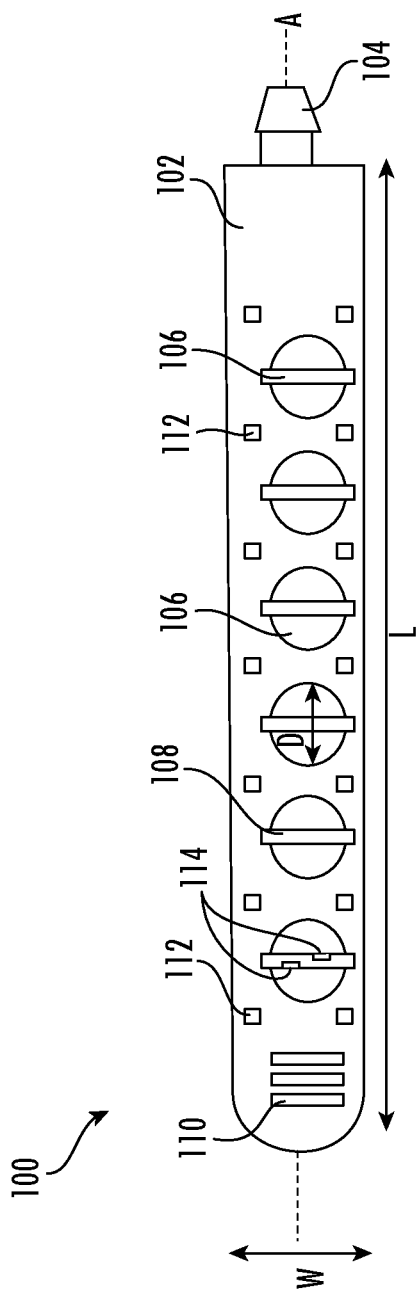
FIG. 1 is a front view of a device adapted for holding one or more discrete cables according to embodiments of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

The present invention now will be described more fully hereinafter with reference to the accompanying drawings, in which illustrative embodiments of the invention are shown.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, devices adapted for holding one or more discrete cables are illustrated in FIGS. 1-10D. Referring to FIGS. 1-4, a device 100 adapted for holding one or more discrete cables 130 may comprise a flexible main body 102, a securing feature 104, and a plurality of apertures 106. Each of these features will be described in greater detail below.

Figure 2:
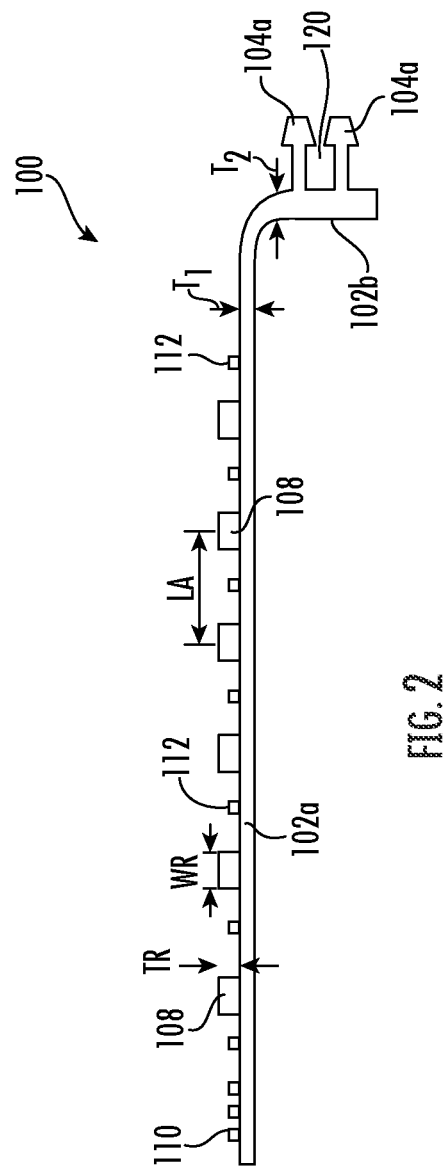
FIG. 2 is a top view of the device of FIG. 1.

As shown in FIGS. 1 and 2, the main body 102 of the device 100 may comprise a wrapping portion 102a and a mounting portion 102b. The main body 102 has a length (L), a width (W), a thickness ($T_1/T_2$), and a longitudinal axis (A). In some embodiments, the main body 102 has a length (L) in the range of about 7 inches to about 12 inches, a width (W) in the range of about 1 inch to about 2 inches, and a thickness ($T_1/T_2$) in the range of about 0.062 inches to about 0.5 inches. The main body 102 is flexible and configured to be wrapped such that the main body 102 can circumscribe one or more discrete cables 130 (see, e.g., FIGS. 3 and 4). In some embodiments, the main body 102 may be formed of a polymeric material. For example, in some embodiments, the main body 102 may comprise rubber, polypropylene, nylon 6,6, or acetal.

The device 100 of the present invention comprises a securing feature 104. The securing feature 104 may be attached to or integral with the mounting portion 102b of the main body 102. The securing feature 104 may be configured to be secured to a mounting structure 150 (see, e.g., FIGS. 3 and 4). For example, in some embodiments, the securing feature 104 may be configured to be secured to a telecommunications tower or monopole. As shown in FIGS. 2-7, in some embodiments, the securing feature 104 may comprise two barbs 104a separated by a cavity 120. As discussed in further detail below, in some embodiments, the cavity 120 is configured to cooperate with a rib 108 when holding or bundling together one or more discrete cables 130 (see, e.g., FIGS. 3-5).

As shown in FIG. 2, in some embodiments, the thickness ($T_2$) of the mounting portion 102b of the main body 102 may be greater than the thickness ($T_1$) of the wrapping portion 102a of the main body 102. For example, in some embodiments, the thickness ($T_2$) of the mounting portion 102b of the main body 102 may be in a range of 0.15 inches to about 0.5 inches and the thickness ($T_1$) of the wrapping portion 102a of the main body 102 may be in a range of about 0.062 inches to about 0.25 inches. Having a greater thickness ($T_2$) of the mounting portion 102b of the main body 102 may help to increase the structural strength of the device 100 and provide a more solid formation to the device 100 when the device 100 is secured to a mounting structure 150 (see, e.g., FIGS. 3 and 4).

Still referring to FIGS. 1 and 2, the device 100 of the present invention may comprise a plurality of apertures 106 spaced apart along the longitudinal axis (A) of the wrapping portion 102a of the main body 102. Each aperture 106 is spaced apart a distance ($L_A$). In some embodiments, the distance ($L_A$) between each aperture 106 is in the range of about 1 inch to about 2 inches. In some embodiments, the securing feature 104 may be configured to be received through one of the apertures 106 when the main body 102 of the device 100 is wrapped around one or more discrete cables 130 (e.g., bundling together a plurality of cables 130). Thus, each aperture 106 may be sized such that the securing feature 104 may be inserted through a respective aperture 106. For example, in some embodiments, each aperture 106 may have a diameter (D) in the range of about 0.5 inches to about 1 inch (nominally, about 0.75 inches).

As shown in FIG. 1, in some embodiments, each aperture 106 may comprise a rib 108 that extends across the respective aperture 106. Each rib 108 may be aligned perpendicular or parallel to the longitudinal axis (A) of the main body 102. For example, as shown in FIG. 1, the ribs 108 are aligned perpendicular to the longitudinal axis (A). In some embodiments, each rib 108 may be configured to cooperate with the securing feature 104 when the device 100 is holding one or more discrete cables 130 and/or when the device 100 is being secured to a mounting structure 150 (see, e.g., FIG. 3) to provide additional stability.

In some embodiments, each rib 108 may have a thickness ($T_R$) in the range of about 0.25 inches to about 0.5 inches and a width ($W_R$) in the range of about 0.15 inches to about 0.45 inches. In some embodiments, the thickness ($T_R$) and width ($W_R$) of each rib 108 correspond to the depth ($D_C$) and width ($W_C$), respectively, of the cavity 120 of the securing feature 104 (see, e.g., FIG. 4).

In some embodiments, the main body 102 of the device 100 may comprise a plurality of stabilizing members (or feet) 112 (see, e.g., FIGS. 1-4). The stabilizing members 112 may extend radially outwardly from one side of the wrapping portion 102a of the main body 102. The stabilizing members 112 may improve stability of the device 100 by helping to limit or prevent the device 100 from rocking/swaying after the securing feature 104 is inserted through an aperture 106 and the device 100 is secured to a mounting structure 150 (see, e.g., FIGS. 3 and 4).

Figure 3:
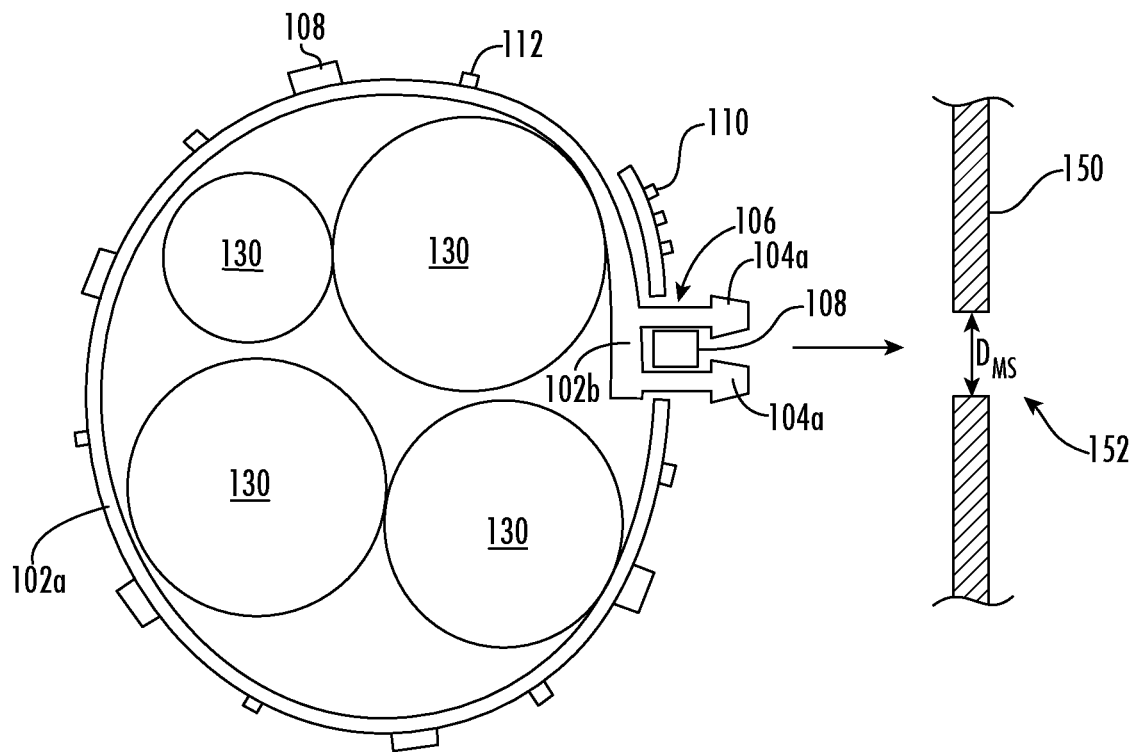
FIG. 3 is a top view of the device of FIG. 1, in combination with a plurality of discrete cables, being secured to a mounting structure according to embodiments of the present invention.
Figure 4:
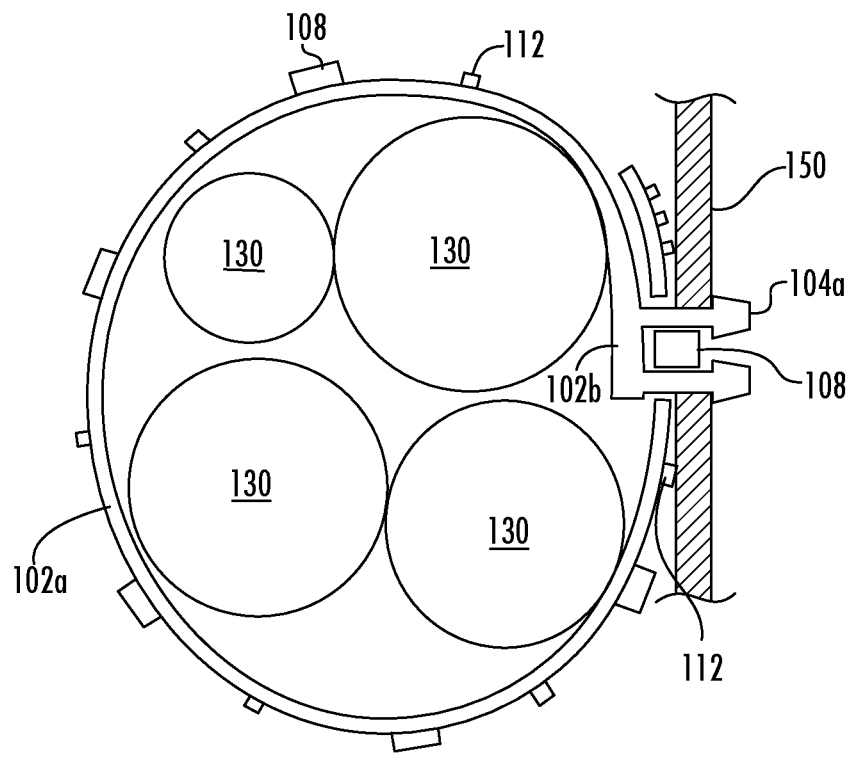
FIG. 4 is a top view of the device in combination with a plurality of discrete cables shown in FIG. 3 secured to a mounting structure.

Referring now to FIGS. 3 and 4, as discussed above, the device 100 of the present invention is adapted for holding one or more discrete cables 130 and securing the one or more cables 130 to a mounting structure 150. As shown in FIG. 3, the main body 102 of the device 100 may have sufficient flexibility to be wrapped around a plurality of discrete cables 130. In some embodiments, the one or more discrete cables 130 comprise fiber optic cables, hybrid fiber/power cables and/or coaxial cables. After the wrapping portion 102a of the main body 102 is wrapped to circumscribe the cable(s) 130, the securing feature 104 may be inserted through one of the apertures 106 such that the main body 102 holds or bundles together the cables 130. When the securing feature 104 is inserted through one of the apertures 106, the rib 108 within the aperture 106 cooperates with the securing feature 104 (e.g., the cavity 120 between the barbs 104a and the shoulders 105 of each barb 104a) (see also, e.g., FIG. 5) to hold the main body 102 of the device 100 circumscribed around the one or more cables 130.

As shown in FIGS. 3 and 4, the device 100, in combination with a bundle of cables 130, may be secured to a mounting structure 150 by further inserting the securing feature 104 into a pre-configured aperture 152 in the mounting structure 150. For example, in some embodiments, the aperture 152 in the mounting structure 150 may be configured to receive the barbs 104a of the securing feature 104, thereby securing the device 100 (and the bundle of cables 130) to the mounting structure 150. In some embodiments, the securing feature 104 is configured to be secured in an aperture 152 in the mounting structure 150 having a diameter ($D_{MS}$) in the range of about 0.5 inches to about 1 inch (nominally, about 0.75 inches).

As discussed above, each rib 108 may be aligned either perpendicular or parallel to the longitudinal axis (A) of the main body 102. The orientation of each rib 108 within an aperture 106 may correspond with the orientation of the securing feature 104. This allows the ribs 108 to cooperate with the securing feature 104 when holding or bundling together one or more discrete cables 130 and/or securing the device 100 to a mounting structure 150. For example, when the securing feature 104 comprises two barbs 104a, if the orientation of each rib 108 is perpendicular to the longitudinal axis (A) of the main body 102, then the orientation of the two barbs 104a should be parallel to the longitudinal axis (A) of the main body 102. This orientation allows the ribs 108 to properly align with the cavity 120 between the barbs 104a of the securing feature 104. As mentioned above, in some embodiments, the barbs 104a may each comprise a shoulder 105 that is configured to engage the rib 108 when the rib 108 is within the cavity 120 (see also, e.g., FIG. 5).

If the orientation of each rib 108 is parallel to the longitudinal axis (A) of the main body 102, then the orientation of the two barbs 104a should be rotated 90 degrees relative to the longitudinal axis (A) of the main body 102 (i.e., perpendicular). The ribs 108, in cooperation with the cavity 120 (and shoulders 105) of the securing feature 104, may provide support to help prevent the securing feature 104 from snapping in and/or out of the aperture 152 in the mounting structure 150.

Figure 5:
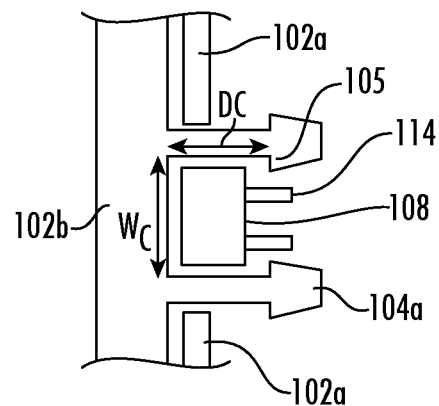
FIG. 5 is an enlarged top view of an alternative embodiment of the mounting portion of the device of FIG. 1.

Referring now to FIG. 5, in some embodiments, the ribs 108 may comprise a plurality of protrusions 114. The protrusions 114 may be staggered along the length of each rib 108 (see also, e.g., FIG. 1). The protrusions 114 may provide added support to the rib 108 when the rib 108 is secured in the cavity 120 of the securing feature 104. For example, the protrusions 114 may provide additional support to the barbs 104a to help prevent the securing feature 104 from snapping in and/or out of the aperture 152 in the mounting structure 150.

In some embodiments, the device 100 of the present invention may comprise at least one gripping tab 110 (see, e.g., FIG. 1). The at least one gripping tab 110 may be attached to or integral with the main body 102. The at least one gripping tab 110 may reside at an end of the main body 102 opposite to the securing feature 104 (i.e., opposite to the mounting portion 102b of the main body 102). The gripping tab(s) 110 provides the technician a place to hold the device 100 when wrapping the device 100 around the cable(s) 130. The gripping tab(s) 110 may help to reduce grip slippage during use of the device 100.

Figure 6:
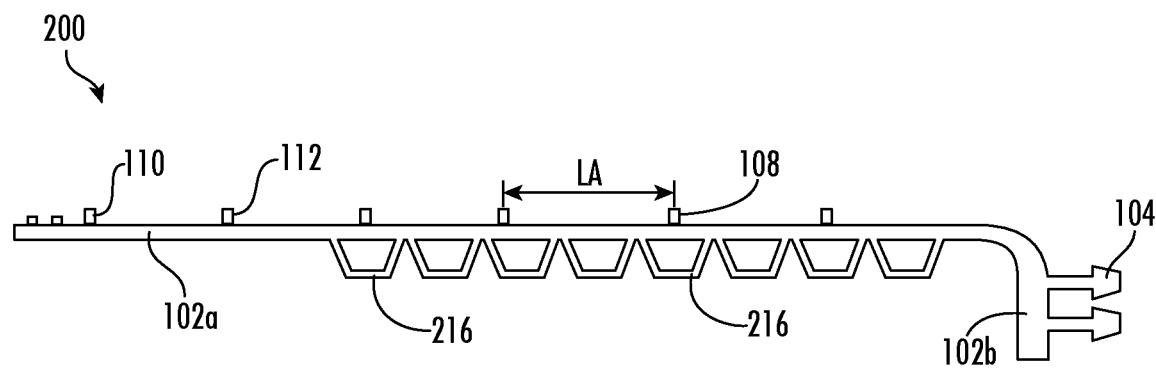
FIG. 6 is a top view of a device adapted for holding one or more discrete cables according to embodiments of the present invention.
Figure 7:
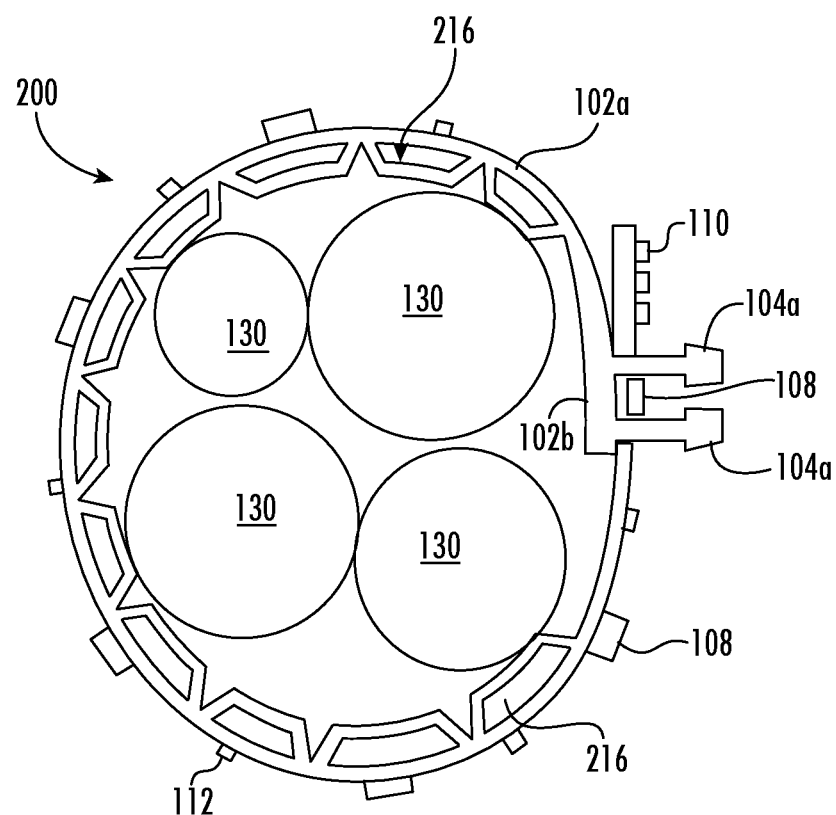
FIG. 7 is a top view of the device of FIG. 6 in combination with a plurality of discrete cables.

Referring now to FIGS. 6 and 7, a device 200 adapted for holding one or more discrete cables is shown therein. The device 200 is similar to the device 100 shown above, except the device 200 may further comprise one or more conforming members 216. As shown in FIG. 6, the one or more conforming members 216 may reside along the "inside" of the wrapping portion 102a of the main body 102 of the device 200. In some embodiments, the conforming members 216 may be configured to further secure or "cushion" the one or more discrete cables 130 when the cable(s) 130 are circumscribed by the main body 102. The conforming members 216 may be in a variety of different shapes and sizes. For example, in some embodiments, the conforming members 216 have a polygonal or arced shape, and/or may be hollow (see, e.g., FIGS. 6 and 7) or solid.

In some embodiments, the conforming members 216 may comprise a separate unitary member. In some embodiments, the conforming members 216 may comprise a molded soft polymer material. The molded polymer material may be pliable and/or soft such that the conforming member(s) 216 may mold or "conform" to the one or more cables 130 as the device 200 is wrapped around the cable(s) 130. For example, in some embodiments, the conforming members 216 may comprise a silicone, a silicone gel or a thermoplastic elastomer.

The conforming members 216 may take up "slack" and/or provide a "cushion" for the cable(s) 130 in the main body 102 that may result due to the spacing (or periods) ($L_A$) between the plurality of apertures 106 when the device 200 is wrapped around one or more cables 130. For example, during wrapping of the device 200, inserting the securing feature 104 through one aperture 106 may result in the device 200 being too loose around the cable(s) 130, whereas inserting the securing feature 104 through the next aperture 106 may result in the device being too tight around the cable(s) 130. The conforming members 216 may assist in taking up (reducing) the "slack" in the device 200 and/or provide additional support ("cushion") to the cable(s) 130 from differences in tightness of the device 200 from aperture 106 to aperture 106.

Figure 8:
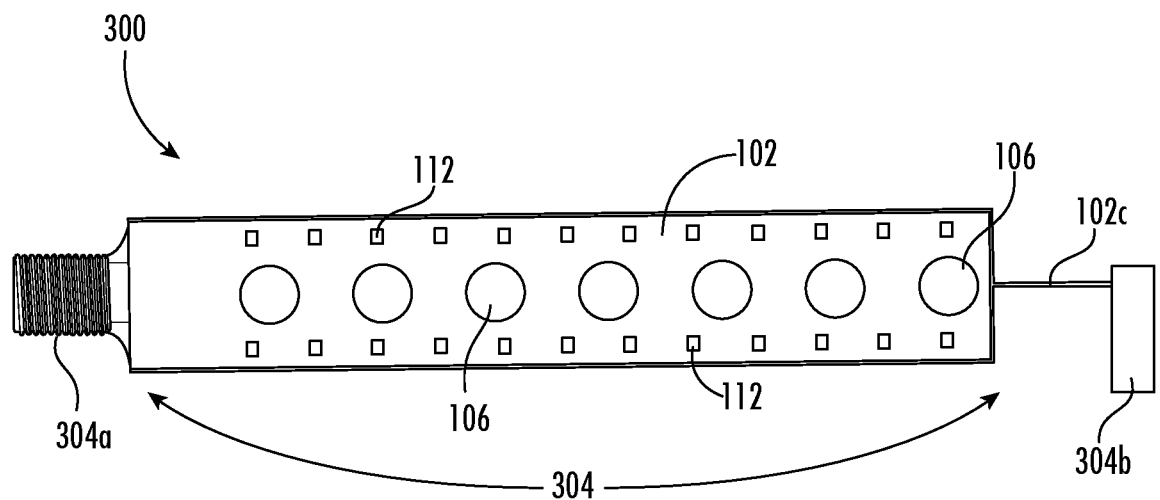
FIG. 8 is a front view of a device adapted for holding one or more discrete cables according embodiments of the present invention.

Referring now to FIG. 8, a device 300 adapted for holding one or more discrete cables is shown therein. The device 300 is similar to the devices 100, 200 shown above, except that the device 300 comprises an alternative securing feature 304 and the main body 102 of the device 300 comprises a frangible portion 102c.

As shown in FIG. 8, in some embodiments, the securing feature 304 may comprise a threaded post 304a and a capture member 304b. The threaded post 304a may be configured to be received through one of the plurality of apertures 106 when the main body 102 of the device 300 is wrapped around the one or more discrete cables 130. For example, in some embodiments, the threaded post 304a is configured to be received through an aperture 106 having a diameter (D) in the range of about 0.5 inches to about 1 inch (nominally, about 0.75 inches). The capture member 304b may be configured to be secured (e.g., threaded or snapped) onto to the threaded post 304a.

In some embodiments, the main body 102 of the device 300 may comprise a frangible portion 102c. The frangible portion 102c may attach the capture member 304b to the device 300. The frangible portion 102c is configured to break away from the main body 102 such that the capture member 304b may be detached from the main body 102 of the device 300, thereby allowing the capture member 304b to be secured onto the threaded post 304a. In some embodiments, the threaded post 304a may be a threaded bolt and the capture member 304b may be a breakaway nut (see, e.g., FIG. 8).

Figure 9:
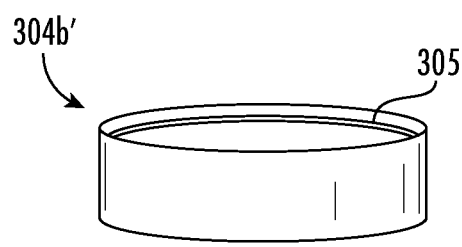
FIG. 9 is a side perspective view of a securing feature according to embodiments of the present invention.

In some embodiments, a capture member 304b' may comprise an interior ridge 305 (see, e.g., FIG. 9). The ridge 305 may be configured to interlock with at least one thread of the post 304a. For example, in some embodiments, the capture member 304b' may be pushed onto the threaded post 304a until the ridge 305 interlocks with at least one of the threads of the post 304a. Other securing features 304 may be used as an alternative to the breakaway nut 304b, 304b', such as, for example, an elastic band or a retaining ring. Also, the post 304a may have annular, rather than helical, threads, particularly when used with a capture member 304b' having a ridge 305.

A securing feature 104 comprising a threaded bolt 304a and breakaway nut 304b may help to mitigate the stress that is applied on the securing feature 304 when the main body 102 of the device 300 circumscribes the cables 130. The additional retaining capability may reduce the chances of the securing feature 304 failing while the device is holding one or more cables 130.

Referring now to FIGS. 10A-10D, a device 400 adapted for holding one or more discrete cables is illustrated. The device 400 is similar to the device 100 described herein in that the device 400 comprises a flexible main body 402, a securing feature 404, and a plurality of apertures 406. The main body 402 is flexible and configured to be wrapped such that the main body 402 can circumscribe one or more discrete cables 130. The main body 402 of the device 400 may comprise a wrapping portion 402a and a mounting portion 402b. In some embodiments, the main body 402 may be formed of a polymeric material. For example, in some embodiments, the main body 402 may comprise rubber, polypropylene, nylon 6,6, or acetal.

Similar to device 100, the securing feature 404 of device 400 may be attached to or integral with the mounting portion 402b of the main body 402. The securing feature 404 may be configured to be secured to a mounting structure 150. For example, in some embodiments, the securing feature 404 may be configured to be secured to a telecommunications tower, cable hanger adapter, or monopole.

Figure 10A:
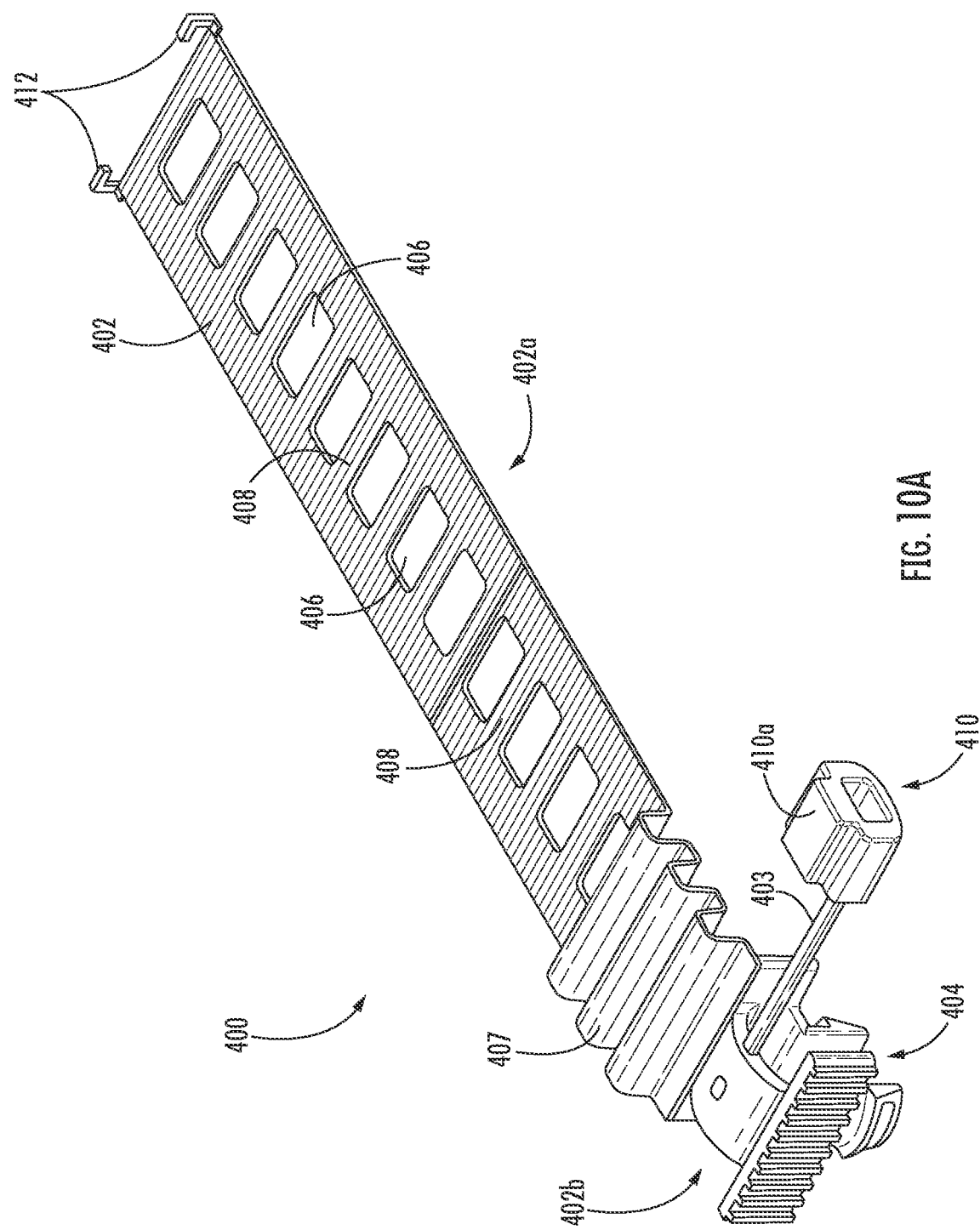
FIG. 10A is a front perspective view of a device adapted for holding one or more discrete cables according to embodiments of the present invention.
Figure 10B:
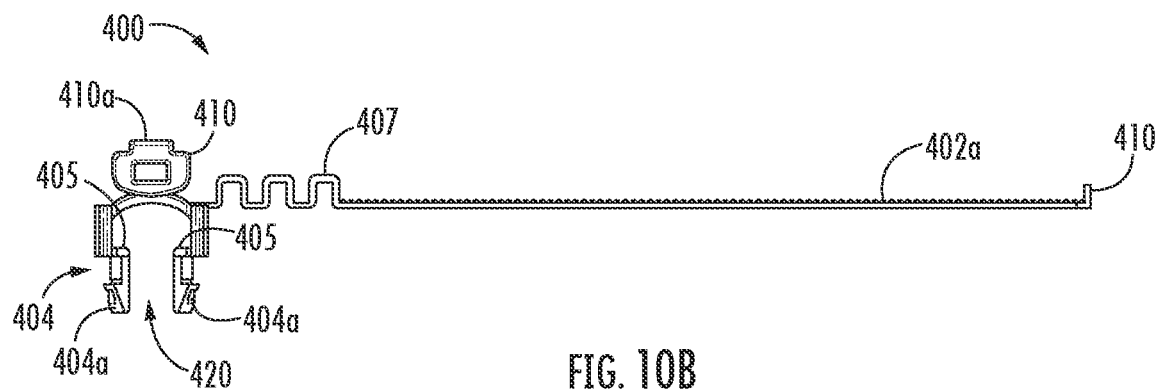
FIG. 10B is a side view of the device of FIG. 10A.
Figure 10C:
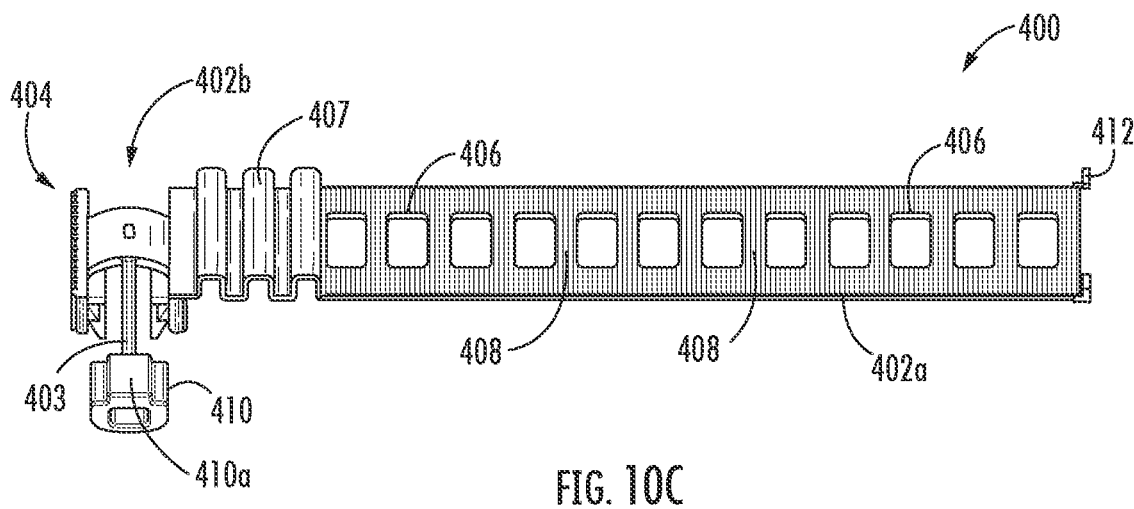
FIG. 10C is a top view of the device of FIG. 10A.

As shown in FIG. 10B, in some embodiments, the securing feature 404 may comprise two barbs 404a separated by a cavity 420. Each barb 404a is configured to be received by a respective aperture 406 in the wrapping portion 402a of the main body 402 of the device 400. In some embodiments, the barbs 404a may each comprise a shoulder 405 that may further define the cavity 120.

The cavity 420 is configured to receive a section (or "rib") 408 of the main body 402 located between each aperture 406. For example, when holding or bundling together one or more discrete cables 130, as each barb 404a of the securing feature 404 is inserted through a respective aperture 406, the rib 408 between each aperture 406 is received within the cavity 420. The barbs 404a (i.e., the securing feature 404) may then be secured to a mounting structure 150, thereby securing the rib 408 within the cavity 420.

In some embodiments, between the wrapping portion 402a and the mounting portion 402b, the device 400 may comprise a plurality of undulations 407. Similar to the stabilizing members 112 described herein, the undulations 407 may improve stability of the device 400 by helping to limit or prevent the device 400 from rocking/swaying after the securing feature 404 is inserted through an aperture 406 and the device 400 is secured to a mounting structure 150. In addition, the undulation 407 may contribute to the flexibility of the device 400 to help the wrapping portion 402a to circumscribe one or more discrete cables 130.

Figure 10D:
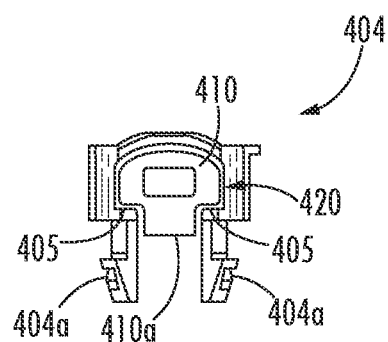
FIG. 10D is an enlarged side view of the securing feature of the device of FIG. 10A with the plug inserted into the cavity of the securing feature.

As shown in FIGS. 10A-10D, in some embodiments, the device 400 may further comprise a plug 410 coupled to or integral with the mounting portion 402b of the main body 402. The plug 410 is sized and configured to be inserted into the cavity 420. In some embodiments, the plug 410 is coupled to or integral with the mounting portion 402b via a flex member 403. The flex member 403 is configured such that the plug 410 may be inserted into the cavity 420 of the securing feature 404 while remaining coupled to the mounting portion 402b of the device 400. In some embodiments, the plug 410 may comprise a protrusion 410a. As shown in FIG. 10D, the protrusion 410a may be sized and configured such that when the plug 410 is inserted into the cavity 420 of the securing feature 404, the protrusion 410a extends between the shoulders 405 of the barbs 404a, thereby providing additional support to the barbs 404a to help prevent the securing feature 404 from snapping in and/or out of an aperture 152 in the mounting structure 150.

In some embodiments, the device 400 may further comprise two guide hooks 412 adjacent to the free end of the wrapping portion 402a of the main body 402. The guide hooks 412 may be used to manage excess of the wrapping portion 402a when the device 400 is wrapped to circumscribe the cable(s) 130. For example, once wrapped around one or more discrete cables 130 (e.g., bundling together a plurality of cables 130), the installer may hook the remaining wrapping portion 402a of the device 400 onto itself using the two guide hooks 412.

Methods for holding one or more discrete cables are also provided. In some embodiments, a method for holding one or more discrete cables may comprise (i) providing a device adapted for holding one or more discrete cables, the device comprising: a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables; a securing feature attached to or integral with the mounting portion of the main body and configured to be secured to a mounting structure; and a plurality of apertures along the longitudinal axis of the wrapping portion of the main body, wherein the securing feature is configured to be received through one of the plurality of apertures when the main body is wrapped around the one or more discrete cables; (ii) wrapping the wrapping portion of the main body of the device around the one or more discrete cables; and (iii) inserting the securing feature through one of the apertures, thereby holding the one or more discrete cables. In some embodiments, the method may further comprise inserting the securing feature through an aperture in the mounting structure, thereby securing the device and the one or more cables to the mounting structure.

In some embodiments, the method may comprise (i) providing a device adapted for holding one or more discrete cables. The device may comprise a flexible main body formed of a polymeric material having a length, a width, a thickness, and a longitudinal axis. The main body may include a wrapping portion, a mounting portion, and a frangible portion. The wrapping portion may be configured to be wrapped such that the main body circumscribes the one or more discrete cables. The device may further comprise a securing feature attached to or integral with the mounting portion of the main body and configured to be secured to a mounting structure. The device may further comprise a plurality of apertures along the longitudinal axis of the wrapping portion of the main body. The securing feature may comprise a threaded post and a capture member. The threaded post may be configured to be received through one of the plurality of apertures when the main body is wrapped around the one or more discrete cables. The capture member may be attached to the main body by the frangible portion and configured to be detached from the main body and threaded onto the threaded post. The method may further comprise (ii) wrapping the wrapping portion of the main body of the device around the one or more discrete cables; (iii) breaking the frangible portion to detach the capture member from the main body; (iv) inserting the threaded post through one of the apertures; and (v) securing the capture member onto the threaded post, thereby holding the one or more discrete cables.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A method for holding one or more discrete cables, the method comprising:
    providing a device adapted for holding one or more discrete cables, the device comprising:
        a flexible main body formed of a polymeric material having a length, a width, a thickness, and a longitudinal axis, the main body including a wrapping portion and a mounting portion, wherein the wrapping portion is configured to be wrapped such that the main body circumscribes the one or more discrete cables;
        a securing feature attached to or integral with the mounting portion of the main body and configured to be secured to a mounting structure; and
        a plurality of apertures along the longitudinal axis of the wrapping portion of the main body,
        wherein the securing feature is configured to cooperate with a segment of the wrapping portion residing between adjacent apertures along the wrapping portion;
    wrapping the wrapping portion of the main body of the device around the one or more discrete cables;
    inserting the securing feature through one of the apertures, thereby holding the one or more discrete cables; and
    inserting the securing feature through an aperture in the mounting structure, thereby securing the device and the one or more cables to the mounting structure.

2. A cable holding device, comprising:
    a flexible main body formed of a polymeric material, the main body including a planar wrapping portion and a mounting portion, wherein the planar wrapping portion is configured to be wrapped such that the main body circumscribes one or more cables;
    a plurality of undulations between the mounting portion and the planar wrapping portion of the device;
    a securing feature attached to or integral with the mounting portion of the main body and configured to be secured to a mounting structure;
    a plurality of apertures along a longitudinal axis of the planar wrapping portion of the main body, each aperture adapted to receive the securing feature,
    wherein the securing feature is configured to cooperate with a segment of the planar wrapping portion residing between adjacent apertures along the planar wrapping portion when holding one or more cables and/or securing the device to the mounting structure.

3. The device of claim 2, wherein the securing feature comprises two barbs separated by a cavity, the cavity configured to cooperate with the segment of the planar wrapping portion residing between adjacent apertures along the planar wrapping portion when holding one or more cables and/or securing the device to the mounting structure.

4. The device of claim 2, in combination with one or more cables, wherein the main body is wrapped around the one or more cables and the securing feature is received through at least one of the plurality of apertures, thereby holding the one or more cables.

5. The device of claim 4, wherein the device is secured to the mounting structure via insertion of the securing feature into a hole in the mounting structure.

6. The device of claim 2, further comprising a pair of guide hooks attached to or integral with a free end of the planar wrapping portion of the main body.

7. The device of claim 2, further comprising at least one stabilizing member extending outwardly from the mounting portion of the main body.

8. The device of claim 2, wherein the main body has a length in the range of about 7 inches to about 12 inches, a width in the range of about 1 inch to about 2 inches, and a thickness in the range of about 0.062 inches to about 0.5 inches.

9. The device of claim 2, wherein the securing feature is configured to be secured in a hole in the mounting structure, the hole having a diameter in the range of about 0.5 inches to about 1 inch.

10. The device of claim 2, wherein the polymeric material comprises rubber, polypropylene, or nylon.

11. The device of claim 4, wherein the one or more cables comprise cables selected from a group consisting of fiber optic cables, power cables, hybrid fiber/power cables and/or coaxial cables.

12. A device for holding cables, in combination with one or more cables, the device comprising:
    a flexible main body formed of a polymeric material, the main body including a planar wrapping portion and a mounting portion, wherein the planar wrapping portion is configured to be wrapped such that the main body circumscribes the one or more cables;
    a plurality of undulations between the mounting portion and the planar wrapping portion of the device;
    a securing feature attached to or integral with the mounting portion of the main body and configured to be secured to a mounting structure; and
    a plurality of apertures along a longitudinal axis of the planar wrapping portion of the main body, each aperture adapted to receive the securing feature,
    wherein the main body is wrapped around the one or more cables and the securing feature is received through at least one of the plurality of apertures, thereby holding the one or more cables, wherein the securing feature comprises two barbs separated by a cavity, the two barbs configured to be received through adjacent apertures along the planar wrapping portion of the main body and the cavity is configured to cooperate with a segment of the planar wrapping portion residing between the adjacent apertures, when securing the device to the mounting structure.

13. The device of claim 12, wherein the device is secured to the mounting structure via insertion of the securing feature into a hole in the mounting structure.

14. The device of claim 12, further comprising a pair of guide hooks attached to or integral with a free end of the planar wrapping portion of the main body.

15. The device of claim 12, further comprising at least one stabilizing member extending outwardly from the mounting portion of the main body.

16. The device of claim 12, wherein the one or more cables comprise cables selected from a group consisting of fiber optic cables, power cables, hybrid fiber/power cables and/or coaxial cables.

\* \* \* \* \*